United States Patent Office 2,862,031
Patented Nov. 25, 1958

2,862,031

VITAMIN A INTERMEDIATES AND PROCESS FOR OBTAINING SAME

Davide R. Grassetti, Richmond, Calif., assignor to Nopco Chemical Company, Harrison, N. J., a corporation of New Jersey No Drawing. Application August 21, 1957
Serial No. 679,519

17 Claims. (Cl. 260—563)

This invention relates to the preparation of vitamin A and more specifically, relates to the preparation of intermediate compounds which can be employed in the preparation of vitamin A.

The synthesis of vitamin A has engaged the attention of the art since the structure of vitamin A was first disclosed by Karrer in 1933. Many routes of the synthesis of vitamin A have been advanced and a considerable body of literature has been developed concerning the prepartion of vitamin A, vitamin A active materials and vitamin A intermediates. Because of the demand for vitamin A and the market which exists for this compound, efforts are constantly being made to devise new and improved methods both for the total synthesis of vitamin A and for the preparation of intermediate compounds which can be employed in the production of vitamin A.

For instance, in U. S. patent applications, Serial No. 545,123 of Klein, Beckmann and Schaaf, filed November 4, 1955 now Patent No. 2,819,310 and Serial No. 545,125 of Schaaf, Klein and Kapp, filed November 4, 1955 now Patent No. 2,819,308, methods have been disclosed for the preparation of vitamin A active material by treating either the cis or the trans form of a material having the empirical formula $C_{20}H_{30}O$ and the structural formula

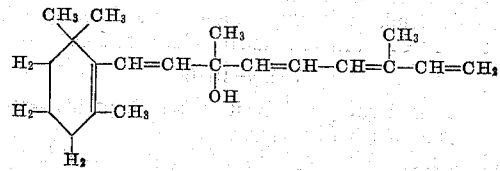

which compound contains the beta ionone ring structure, four ethylenic bonds and one hydroxyl group, and which in the trans configuration has an absorption maximum in the ultra-violet at 2710 A., a molecular extinction coefficient at that wave length of 29,100 and has a refractive index at 20° C. of 1.552, and which is the cis configuration has an absorption maximum in the ultraviolet at 2740 A., a molecular extinction coefficient at that wave length of 25,900 and has a refractive index at 16° C. of 1.535 (referred to hereinafter as Compound I) with a boron trifluoride hexamethylene tetramine complex under appropriate reaction conditions in a water-containing aromatic hydrocarbon solvent solution or in solution in a solvent selected from the group consisting of acetone, acetonitrile, acrylonitrile, benzyl cyanide, dioxane, isopropenyl acetate and tetrahydrofuran. Thereafter, the reaction mixture is worked up with an alkaline material followed by extraction of the product with an appropriate solvent e. g., hexane, ether, etc. The resulting product which is vitamin A active is referred to hereinafter as Compound IV. Compound IV contains a hexamethylene tetramine fragment in the molecule.

When tested biologically on rats, Compound IV shows a vitamin A activity of about 50%. Its ultra-violet spectrographic characteristics are practically identical with those of vitamin A; however, infra-red spectrographic analysis shows that Compound IV does not contain a hydroxyl group, but that it does contain an amine group. Analysis of Compound IV by the Kjeldahl method shows that Compound IV has a nitrogen content which is about 9.6% and is about twice the nitrogen content of vitamin A amine. Vitamin A amine has the same structure as vitamin A, only the amine group has replaced the hydroxyl group of vitamin A. The 9.6% figure is also twice as large as the basic nitrogen value which is obtained by titration of this compound with approximately 0.02 N perchloric acid in glacial acetic acid. This indicates that the molecule contains more than one nitrogen atom and that not all of it is basic. Thus the physical and chemical characteristics of Compound IV indicate that it contains the vitamin A chromophoric system wherein the hydroxyl group of vitamin A has been replaced by a basic fragment similar to a major portion of the hexamethylene tetramine molecule.

Compound IV is a viscous liquid soluble in ethyl ether, ethyl alcohol, acetone and similar solvents. It has an absorption maximum in the ultra-violet region of the spectrum at 3250 A. and has at that wave length an extinction coefficient ($E_{1cm}^{1\%}$) of about 1000

If it is treated with hydrobromic acid, a product is obtained which has an absorption maximum at 3300 A. Likewise treatment of Compound IV with phosphoric acid gives a product having an absorption maximum at 3280–3300 A. Presumably salts of Compound IV are formed by treatment with hydrobromic acid and phosphoric acid since treatment of the products with alkali gives in each case the original Compound IV. Acetylation of Compound IV with acetic anhydride gives a product which when analyzed by infra-red analysis shows the presence of an amide band in the infra-red spectrographic curve.

Compound IV can be converted to vitamin A amine by treating it with aluminum isopropoxide in accordance with the procedure disclosed and claimed in U. S. patent application, Serial No. 545,124, Klein, filed November 4, 1955 now Patent No. 2,819,309. Also, Compound IV can be converted into vitamin A aldehyde by treating it with iodine in accordance with the procedure disclosed and claimed in U. S. patent application, Serial No. 545,122, Klein and Grassetti, filed November 4, 1955 now Patent No. 2,819,311.

However, Compound IV has some disadvantages regarding its use as a starting material for producing vitamin A aldehyde by treatment with iodine. For instance, to obtain Compound IV, the reaction mixture obtained from the reaction between Compound I and boron trifluoride hexamethylene tetramine complex must be worked up by treatment with an alkaline material e. g., sodium hydroxide, ammonia, or ethanolamine in order to react with all of the boron trifluoride present in the reaction mixture. Thereafter Compound IV is recovered from the reaction mixture by extraction with a solvent followed by evaporation to remove the solvent. The extraction step for recovering the worked up reaction product involves the use of the solvents which are both hazardous and expensive thereby requiring safety precautions as well as recovery operations. The evaporation step involves careful control owing to the sensitivity of Compound IV to heat and oxidation. Furthermore, it has been essential to employ an additional reagent, viz., iodine in order to convert Compound IV to vitamin A aldehyde.

Accordingly, it is an object of the present invention to provide an improved method for the synthesis of vitamin A.

It is a more particular object of this invention to provide a novel and effective method for the production of new materials which are valuable intermediates useful in the production of vitamin A.

A further object is the preparation of vitamin A aldehyde in a more direct and convenient manner than has heretofore been accomplished.

A still further object is the preparation of vitamin A aldehyde in increased yields from Compound I.

Further objects will become apparent from the detailed description given hereinafter. It is intended, however, that the detailed description and the specific example do not limit the invention but merely indicate the preferred embodiments thereof since various changes and modifications within the scope of the invention will become apparent to those skilled in the art.

It has been discovered that the above and other objects can be achieved by heating, in the presence of water, the reaction product complex of Compound I and boron trifluoride hexamethylene tetramine complex. Preferably the reaction product need not be isolated but may be heated with water in situ in its reaction mixture. By this discovery, the hitherto essential steps of working up the reaction product with alkaline materials in order to obtain Compound IV as well as its subsequent recovery or isolation are eliminated along with the use of iodine.

The reaction product of boron trifluoride hexamethylene tetramine complex and Compound I may be obtained in a manner similar to the procedures described in Serial No. 545,123 and Serial No. 545,125. The cis or the trans form of Compound I may be reacted with the aforesaid boron trifluoride hexamethylene tetramine complex in a water-containing aromatic hydrocarbon solution such as benzene, toluene, xylene, methyl isopropyl benzene, ethyl benzene, diethyl benzene, mesitylene, butyl benzene, amyl benzene, etc. Similar aromatic hydrocarbon solvents are highly suitable as the reaction medium. These hydrocarbon solvents are substantially water-immiscible but they will dissolve a small percentage of water. Also, acrylonitrile, benzyl cyanide, isopropenyl acetate and tetrahydrofuran may be used. When this reaction product, without isolating it from its reaction mixture, is to be subsequently treated with water to effect its conversion to vitamin A aldehyde, it is highly preferable to select a solvent that will form a homogeneous system. Examples of suitable solvents are acetone, acetonitrile, dioxane, etc., and mixtures of such solvents. The preferred solvent is dioxane containing a small amount of water.

The hexamethylene tetramine complex of boron trifluoride which is employed is one in which the ratio of boron trifluoride to hexamethylenetetramine varies from an average of about 1.5 to an average of about 2.5 molecules of boron trifluoride for each molecule of hexamethylene tetramine. Complexes containing larger or smaller ratios of boron trifluoride are not nearly as satisfactory for use in the process as complexes containing these preferred ratios of boron trifluoride. Preferably a complex containing an average of about 2 molecules of boron trifluoride for each molecule of hexamethylene tetramine is employed. In carrying out the reaction, we have found that the boron trifluoride does not act in the normal catalytic sense. Thus, in order to obtain the most satisfactory results when using a complex containing about 2 molecules of boron trifluoride for each molecule of hexamethylene tetramine, it is necessary that the boron trifluoride hexamethylene tetramine complex be employed in at least about a mole to mole ratio in proportion to the amount of Compound I which is used in the reaction. Although ratios of less than one to one will produce some product, by far the best results are obtained when at least about a one to one ratio is employed. Molar ratios greater than one to one can be used and are preferred e. g., two moles of boron trifluoride hexamethylene tetramine complex to one mole of Compound I. When the ratio of boron trifluoride to hexamethylene tetramine in the complex is decreased, the mole ratio of the complex to Compound I is preferably increased a corresponding amount. Also, when the ratio of boron trifluoride to hexamethylene tetramine in the complex is increased, the ratio of the complex to Compound I can be correspondingly decreased, if desired, although it is not necessary to do so.

The temperature at which the reaction is carried out can be varied. Preferably, however, the temperature should be between about room temperature and about 35° C.; however, if desired, either lower or higher temperatures can be employed. At room temperature the reaction will normally proceed to completion in not more than about three hours and in many instances will proceed to completion in from fifteen to thirty minutes.

As pointed out above, the preferred solvent is dioxane containing a small amount of water. Since the water forms a complex with boron trifluoride, it might be thought that the presence of water in the reaction mixture would inactivate the boron trifluoride hexamethylene tetramine complex. However, water does not inactivate the boron trifluoride hexamethylene tetramine complex. Preferably, when dioxane is the solvent, water is added to the reaction mixture to increase the polarity of the solvent since the reaction appears to proceed more efficiently in a highly polar solvent. Thus from about 1% to 10% of water based upon the volume of the dioxane is preferably employed. Also, if desired, water can be used in the reaction medium when solvents other than dioxane are employed.

Preferably rather dilute solutions of Compound I are employed in carrying out the reaction of Compound I and boron trifluoride hexamethylene tetramine complex. In most cases a concentration of from 0.1 gram to about 1.0 gram of Compound I is present for each 100 ml. of solution.

The resulting product is a new complex produced by interaction of Compound I and boron trifluoride hexamethylene tetramine complex. It is a practically colorless solid, tends to decompose and has a sintering point at about 145° C. It has a $\lambda max = 3300$ A. and an $$E_{1\,cm.}^{1\%} = 1010$$

To prevent decomposition, it is best kept at −10° C. under an atmosphere of nitrogen.

If instead of isolating this reaction product it is worked up by treatment with an alkaline material as described in the aforementioned Serial No. 545,123 and Serial No. 545,125, Compound IV is obtained. However, the reaction product obtained herein is fundamentally different from Compound IV. In other words, it is not merely a complex of Compound IV plus boron trifluoride. This is borne out by the fact that one cannot extrapolate the nitrogen content of the novel complex herein from the nitrogen content of Compound IV. If Compound IV is treated with boron trifluoride the reaction product described herein will not be obtained. Also, if Compound IV is refluxed with water under conditions according to the present invention, no appreciable amount of vitamin A aldehyde is obtained.

The following describes the procedure for obtaining vitamin A aldehyde from the above described reaction product complex of Compound I and boron trifluoride hexamethylene tetramine complex. To this reaction product there is added water in an amount of at least 15 to 30% by volume of the total reaction mixture present including a solvent for the reaction product. The preferred amounts of water present are from 20 to 30% by volume of the total mixture present including solvent. The water is added to the reaction product which has been previously isolated and dissolved in a water-miscible solvent, such as dioxane. Isolation of this reaction product from its reaction mixture may be accomplished by filtration or by adding excess hexamethylene tetramine to the reaction mixture and evaporating to dryness. It has been found that the product is stabilized by the presence of excess hexamethylene tetramine. Preferably the water is added to the reaction product which has not been isolated, but remains in situ in its own reaction mixture which serves as a solvent therefor. It can be seen that the amount of water to be added will vary depending upon the amount of water that may already be present from the reaction of Compound I and the boron trifluoride hexamethylene tetramine complex. However, the total amount of water used is the same as that indicated previously when the reaction product is first isolated and then added to a solvent. Likewise, the total amount of solvent is the same in either case. There is present from about 0.1 to 1.5 grams of reaction product per 100 ml. of total solution. Preferably 1 to 1.5 grams are present.

When carrying out the reaction with water, the reaction mixture is heated, preferably at the reflux temperature of the mixture. However, a temperature range of from 70° C. up to reflux temperature may be used. Only a short time is necessary for heating, usually from about fifteen minutes to an hour has been found ample to bring about formation of vitamin A aldehyde.

For a fuller understanding of the nature and objects of the invention, reference may be had to the following examples which are given merely for purposes of illustration and are not to be construed in a limiting sense.

*Example I*

1.5 grams of the trans isomer of Compound I were dissolved in 50 ml. of purified dioxane. This solution was then added to a second solution of 1.5 grams of boron trifluoride hexamethylene tetramine complex contained in 2 ml. of water. The complex contained 2 molecules of boron trifluoride for each molecule of hexamethylene tetramine. The mixture of the two solutions was allowed to stand at room temperature for one-half hour. Thereafter the product was filtered off. In this manner 1.1 grams of an almost colorless powder was obtained. Upon analysis, this product had an ultra-violet maximum at 3300 A. and an $$E^{1\%}_{1\,cm.} = 1010$$

The product started to decompose at about 110° C. and sintered at about 145° C.

The new complex was found to be insoluble in ethyl acetate and dioxane, fairly soluble in water, and very soluble in methanol, dimethyl formamide and acetonitrile.

In view of the instability of the complex, a precise melting point could not be obtained. The melting point was found to vary depending upon the age and the condition of storage of the sample. Thus in one instance (Example I), the melting point of a fresh sample was at 145° C. with preliminary decomposition at 110° C. while another sample after standing for ten days in the refrigerator had a melting point of 102 to 104° C. Also in other samples which were apparently less pure, the new complex was found to have an ultra-violet maximum between 3300 and 3350 A.

*Example II*

2.86 grams (0.01 mole) of the trans isomer of Compound I were dissolved in 300 ml. of dioxane. 5.5 grams (0.02 mole) of boron trifluoride hexamethylene tetramine complex containing 2 molecules of boron trifluoride for each molecule of hexamethylene tetramine were dissolved in 30 ml. of water. The solution of boron trifluoride hexamethylene tetramine complex was thereafter added to the solution containing the trans isomer of Compound I. A clear yellow solution resulted and it was allowed to stand for a period of forty-five minutes at room temperature. At the end of this time, 80 ml. of distilled water were added and the mixture was refluxed for forty-five minutes. During this period of reflux, formaldehyde was liberated. After refluxing, the reaction mixture was cooled and 75 ml. of a saturated solution of sodium chloride was added and the mixture extracted with hexane. The hexane layer was washed thoroughly with water and then dried over sodium sulfate. 2.5 grams of crude vitamin A aldehyde were obtained from the hexane solution. This represented a crude yield of 88% having an estimated purity of 64.5% by ultra-violet spectrographic analysis. The principal impurities were believed to be polymeric materials and several percent of anhydro vitamin A. The purity was raised to 83% by chromatography over alumina which had been deactivated with 10% water. If desired, the purity can be raised further by subsequent chromatography. The identity of vitamin A aldehyde was established by its ultra-violet spectrum which gave a λmax=3800 A. in isopropanol and by the agreement between its infra-red spectrum and that of a reference curve of vitamin A aldehyde. The product on interaction with hydroxylamine, liberated the expected water, indicating the presence of an aldehyde group. This product was further characterized by reduction with lithium aluminum hydride which resulted in the formation of vitamin A in quantitative yield. The vitamin A obtained in this manner was identified by its ultra-violet and infra-red spectra and by its acetylation value, all of which corresponded to the values of known vitamin A.

*Example III*

1.86 grams of the trans isomer of Compound I were dissolved in 186 ml. of dioxane and added all at once to a solution of 3.39 grams of boron trifluoride hexamethylene tetramine complex in 18.6 ml. of water. The complex contained 2 molecules of boron trifluoride for each molecule of hexamethylene tetramine. The reaction mixture was allowed to stand at room temperature for 30 minutes. At the end of this time, 65 ml. of distilled water were added and the mixture refluxed for 30 minutes. The reaction mixture was then diluted with a saturated aqueous solution of sodium chloride and the vitamin A aldehyde was thereafter extracted with ether. The ether extracts were then washed successively with water, saturated aqueous sodium chloride solution, and finally dried over sodium sulfate. After filtration, the net yield of vitamin A aldehyde in the ether solution was estimated as 55% by ultra-violet spectrographic analysis.

The semicarbazone derivative of vitamin A aldehyde was then prepared in the following manner. The ether solution was evaporated and the residue treated with a solution of 17.3 grams of semicarbazide hydrochloride, 11.6 ml. of pyridine, 10 ml. of water, and 20 ml. of methanol. After one hour at reflux, the reaction mixture was poured into water and extracted with chloroform. The extracts were successively washed with water, 5% aqueous hydrochloric acid, water, aqueous sodium bicarbonate solution, water, and finally aqueous sodium chloride solution. Evaporation of the chloroform extracts gave an oily residue which crystallized on trituration with 150 ml. of pentane. The yellow solids were collected on a Büchner funnel and washed liberally with pentane. A first crop yield of 0.691 gram of vitamin A aldehyde semicarbazone was obtained having a melting point of 188–190.7° C., ultra-violet maxima at 3650 A. and 3750 A. and $$E^{1\%}_{1\,cm.} = 1628 \text{ and } 1662$$

respectively in isopropanol; reported by Wendler and Tishler, J. Am. Chem. Soc. 72 236 (1950) for vitamin A aldehyde semicarbazone, melting point 188–190° C., λ max.=3650 A. and 3800 A., $$E^{1\%}_{1cm.}=1570 \text{ and } 1670$$

respectively in isopropanol. A Kjeldahl nitrogen of the semicarbazone showed 11.98% nitrogen, (calculated nitrogen for $C_{21}H_{31}ON_3$=12.30%). Furthermore, Wendler and Tishler reported that recrystallization from chloroform-ether solution gave a new variety of semicarbazone, melting point of 199–201° C., λ max. 3850 A., $$E^{1\%}_{1cm.}=1860$$

in chloroform. My semicarbazone on recrystallization in the same manner gave a new melting point of 196–199° C., λ max. at 3850 A. and $$E^{1\%}_{1cm.}=1775$$

in chloroform.

The following two examples describe the preparation of the novel reaction product, its isolation and subsequent treatment with water to obtain vitamin A aldehyde.

Example IV 480 mg. of the trans isomer of Compound I were dissolved in 50 ml. dioxane and treated with 916 mg. of boron trifluoride hexamethylene tetramine complex containing 2 molecules of boron trifluoride for each molecule of hexamethylene tetramine which was previously dissolved in 5 cc. water. This reaction mixture was allowed to stand for 45 minutes at room temperature. An aliquot was taken and analyzed spectroscopically. A λ max at about 3350 A. was observed which indicated formation of the complex compound of Compound I and boron trifluoride hexamethylene tetramine complex. The reaction mixture was concentrated to incipient crystallization in the presence of 440 mg. of hexamethylene tetramine which was found to stabilize the complex. Diethyl ether was then added to bring about precipitation. Sufficient amounts were added until precipitation was complete. The precipitate which comprised white solids was washed liberally with diethyl ether. This ether was recovered and analyzed spectroscopically. By ultraviolet analysis, anhydro vitamin A and polymer were shown to be present. The recovered and washed white solids were thereafter refluxed with 25 ml. of a mixture of 60% by volume ethanol and 40% by volume of water for 45 minutes. Crude vitamin A aldehyde was recovered as described in the previous Example II. However, no chromatography was carried out. The net yield was found to be 28% of vitamin A aldehyde free of anhydro vitamin A and having a λ max=3720 A.

Example V

The previous example was repeated except for the following. In this instance the complex compound of Compound I and boron trifluoride hexamethylene tetramine was refluxed with 25 ml. of a mixture of 75% by volume of dioxane and 25% by volume of water. The results obtained were substantially the same as Example IV.

In Examples IV and V, throughout the formation of the novel complex, its recovery and subsequent reflux with water, an atmosphere of nitrogen was maintained.

As all of the reactants and products obtained herein are susceptible to air oxidation, it is desirable to carry out all of the foregoing procedures in the presence of an inert atmosphere such as nitrogen, helium, etc.

As indicated by the foregoing, a novel process for obtaining vitamin A aldehyde has been described. The product is obtained in high yields and good purity. In the preferred embodiment, the reaction product of Compound I and boron trifluoride hexamethylene tetramine complex may be refluxed with water without isolating it from its reaction mixture. Hence, there is eliminated the usually necessary steps present in such procedures. Also an inexpensive reagent, water, has replaced the more expensive iodine which is used in the treatment of Compound IV in the procedure of U. S. patent application Serial No. 545,122 referred to above. Finally, it must be remembered that conversion of Compound I to vitamin A aldehyde via Compound IV is a two step process whereas the present invention involves only a single step. Since the yields of Compound IV, obtained from Compound I, are not quantitative, the net yields of vitamin A aldehyde obtained by the practice of the present invention are actually greater than the net yields obtained from the aforementioned two step process.

It will be appreciated that various modifications can be made in the invention described above and such are within the scope of the present invention as defined in the appended claims.

Having described my invention, what I claim as new and desire to secure by Letters Patent is:

1. A process for producing vitamin A aldehyde which comprises reacting with water a complex obtained by reacting at least one mole of a boron trifluoride hexamethylene tetramine complex containing from about 1.5 to 2.5 moles of boron trifluoride per mole of hexamethylene tetramine at between room temperature and 35° C. in the presence of a solvent with one mole of

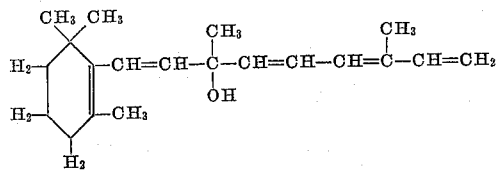

said complex having a λ max=3300 A. and $$E^{1\%}_{1cm.}=1010$$

2. A process for producing vitamin A aldehyde which comprises reacting with water in the presence of a solvent and from a temperature of 70° C. up to the reflux temperature of the mixture, a complex obtained by reacting at least one mole of a boron trifluoride hexamethylene tetramine complex containing from about 1.5 to 2.5 moles of boron trifluoride per mole of hexamethylene tetramine at between room temperature and 35° C. in the presence of a solvent with one mole of

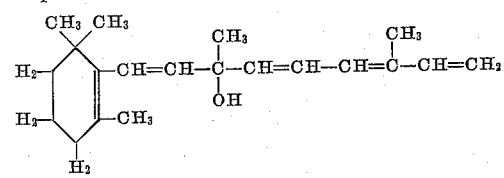

said complex having a λ max=3300 A. and $$E^{1\%}_{1cm.}=1010$$

3. A process for producing vitamin A aldehyde which comprises refluxing with water and in the presence of a solvent, a complex obtained by reacting at least one mole of a boron trifluoride hexamethylene tetramine complex containing from about 1.5 to 2.5 moles of boron trifluoride per mole of hexamethylene tetramine at between room temperature and 35° C. in the presence of a solvent with one mole of

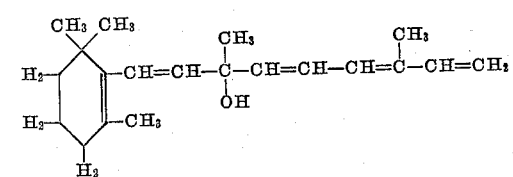

said complex having a λ max=3300 A. and $$E^{1\%}_{1cm.}=1010$$

said water being present in an amount of from 15 to 30% by volume of the total reaction mixture and said complex being present in an amount from about 0.1 to 1.5 grams per 100 ml. of total solution.

4. A process for producing vitamin A aldehyde which comprises refluxing with water and in the presence of a solvent for a period of time from fifteen minutes to three hours, a complex obtained by reacting at least one mole of a boron trifluoride hexamethylene tetramine complex containing from about 1.5 to 2.5 moles of boron trifluoride per mole of hexamethylene tetramine at between room temperature and 35° C. in the presence of a solvent with one mole of

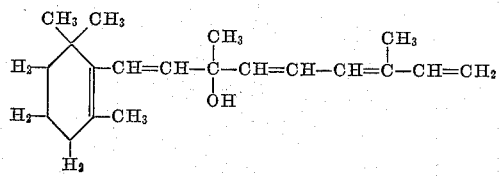

said complex having λ max=3300 A. and $$E_{1\,cm.}^{1\%} = 1010$$

said water being present in an amount of from 20 to 30% by volume of the total solution and said complex being present in an amount from about 1.0 to 1.5 grams per 100 ml. of total solution.

5. The process of claim 4 wherein said reaction time is about forty-five minutes.

6. The process of claim 4 wherein said solvent is dioxane.

7. The process of claim 4 wherein said water comprises about 27% by volume of the total solution.

8. The process of claim 4 wherein said complex is present in an amount of about 1.2 to 1.5% by weight of the total solution.

9. The process of claim 4 in which water is added to said complex in situ in its original reaction mixture and the resulting mixture is refluxed.

10. A process for producing vitamin A aldehyde which comprises refluxing for about forty-five minutes, a complex obtained by reacting at least one mole of a boron trifluoride hexamethylene tetramine complex containing from about 1.5 to 2.5 moles of boron trifluoride per mole of hexamethylene tetramine at between room temperature and 35° C. in the presence of a solvent with one mole of

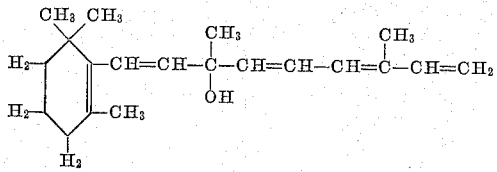

said complex having a λ max=3300 A. and $$E_{1\,cm.}^{1\%} = 1010$$

with water in a solution comprising about 27% water by volume and the remainder dioxane, said complex being present in an amount of about 1.2 to 1.5% by weight of the total solution.

11. A complex compound which is a vitamin A intermediate obtained by reacting at least one mole of a boron trifluoride hexamethylene tetramine complex containing from about 1.5 to 2.5 moles of boron trifluoride per mole of hexamethylene tetramine at between room temperature and 35° C. in the presence of a solvent with one mole of

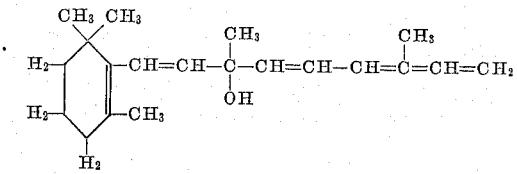

said intermediate having a λ max=3300 A. and $$E_{1\,cm.}^{1\%} = 1010$$

12. A process for obtaining the complex of claim 11 which comprises reacting at least one mole of a boron trifluoride hexamethylene tetramine complex containing from about 1.5 to 2.5 moles of boron trifluoride per mole of hexamethylene tetramine at between room temperature and 35° C. and in the presence of a solvent with one mole of

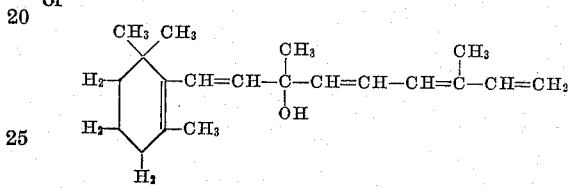

and thereafter recovering said complex.

13. The process of claim 12 in which said solvent is selected from the group consisting of water-containing aromatic hydrocarbons, acetone, acetonitrile, acrylonitrile, benzyl cyanide, dioxane, isopropenyl acetate, tetrahydrofuran and mixtures thereof.

14. The process of claim 13 in which said boron trifluoride hexamethylene tetramine complex contains about two moles of boron trifluoride per mole of hexamethylene tetramine and two moles of said boron trifluoride hexamethylene tetramine complex are present for each mole of

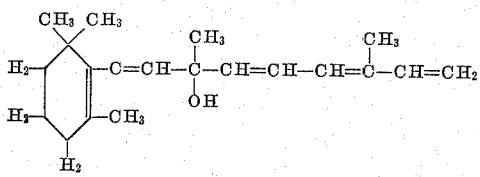

15. The process of claim 14 in which said reaction is carried out for about fifteen minutes to about three hours.

16. The process of claim 15 in which said solvent comprises dioxane containing from about 1 to 10%, based upon the volume of said dioxane, of water.

17. The process of claim 15 in which said

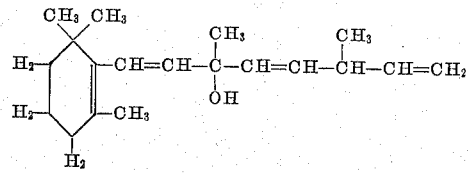

is present in an amount of from 0.1 to 1.0 gram for each 100 ml. of solution.

No references cited.